E. W. NITZSCHE.
TROLLEY WIRE SUPPORT.
APPLICATION FILED DEC. 11, 1914.
1,196,475.
Patented Aug. 29, 1916.
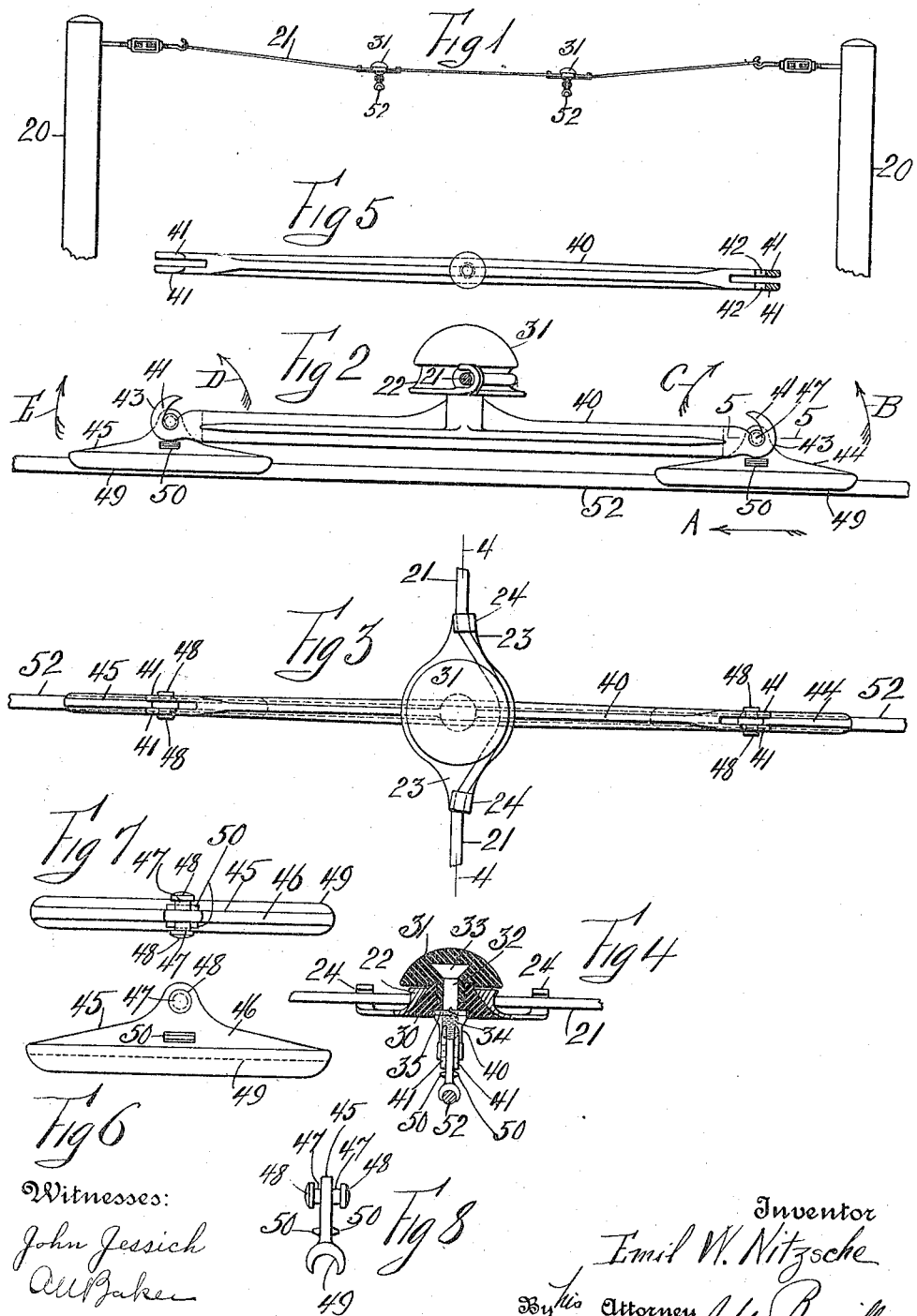
Witnesses:
John Jessich
AW Baker
Inventor
Emil W. Nitzsche
By his Attorney

UNITED STATES PATENT OFFICE.

EMIL W. NITZSCHE, OF NEWARK, NEW JERSEY.

TROLLEY-WIRE SUPPORT.

1,196,475.  Specification of Letters Patent.  Patented Aug. 29, 1916.

Application filed December 11, 1914. Serial No. 876,609.

*To all whom it may concern:*

Be it known that I, EMIL W. NITZSCHE, a citizen of the United States, and a resident of Newark, in the county of Essex and State of New Jersey, have invented certain new and useful Improvements in Trolley-Wire Supports, of which the following is a specification.

This invention relates to trolley wire supports and is specially distinguished by comprising means which permit the flexibility of the trolley wire carried by said supports.

In the accompanying drawings Figure 1 represents an end view of a pair of the trolley wire supports in position with a span wire and its poles; Fig. 2 shows an enlarged side view of one of the trolley wire supports, Fig. 3 is a top plan view of Fig. 2, Fig. 4 represents a partial section of Fig. 3 as on the line 4, 4, Fig. 5 shows a top plan view of a detail and a partial section of Fig. 2 as on the line 5, 5, Fig. 6 shows an enlarged side elevation of a detail, Fig. 7 represents a top plan view of Fig. 6 and Fig. 8 is an end view of Fig. 6.

A pair of poles are indicated at 20, and between which is suspended the span wire 21. A metallic clip indicated at 22 has formed on opposite sides thereof the arms 23 with the hooks 24. The span wire 21 is brought to bear against one of the sides of the clip 22 and engages the hooks 24 in the usual manner. A conical plug 30 of insulating material is located within the clip 22 and carries the cap 31 of insulating material. A screw 32 has its head 33 encased in the cap 31 and its lower end 34 is threaded and carries a lock washer 35. An equalizer bar 40 is in threaded engagement with the threaded end 34 of the screw 32, and has formed at its ends the bifurcated hook ends 41 with the curved bearing surfaces 42 and the outer curved surfaces 43.

In the hook ends 41 are suspended carriers indicated at 44 and 45. Each carrier comprises the body portion 46 that has extending from its upper end at opposite sides thereof the pivots 47 with the flange collars 48. At the lower end of the body portion 46 is formed the curved channel 49. Stops 50 extend from the opposite sides of the body portion 46.

The carriers are located in position by placing the body portion 46 between the members of the bifurcated hook ends 41 and placing the pivots 47 upon the curved bearing surfaces 42. The stops 50 are positioned just below the outer curved surfaces 43 of the hook ends 41 and prevent the displacement of the carriers from said hook ends. The trolley wire 52 is located in the channels 49 and held in position by peening the walls of said channels over said trolley wire.

When a trolley wheel, not shown, of a trolley pole engages the trolley wire 52, and when it is running for example in the direction of the arrow A, the flexible connection between the carrier 44 and the hook end 41 from which it is suspended allows said carrier to swing in the direction of the arrow B. After the said trolley wheel passes beyond a point vertically below the axis of the pivots 47 of said carrier, the latter will swing in the direction of the arrow C and allow the portion of the trolley wire between the two carriers 44 and 45 to rise and accommodate the rise of the trolley wheel between them. When the trolley wheel reaches the carrier 45 the latter in a like manner will first swing in a direction indicated by the arrow D and then in a direction indicated by the arrow E. It will be seen that a certain freedom of motion for the wire is secured, thus preventing the stretching of the same, as occurs when the wire is attached to a stationary support.

Having described my invention what I desire to secure by Letters Patent and claim is:

1. In a support of the character described the combination of a bar and carriers pivoted at the ends of said bar, the said carriers having stops coacting with said bar.

2. In a support of the character described the combination of a bar with hook ends and carriers pivoted to said hook ends, the said carriers having stops coacting with said hook ends.

3. In a support of the character described the combination of a bar with bifurcated hook ends having outer curved surfaces, a carrier for a trolley wire pivoted in each hook end and having stops extending from its sides that coact with the outer curved surfaces of the hook ends.

4. In a support of the character described the combination of a bar with bifurcated hook ends having curved bearing surfaces and curved outer surfaces, a carrier for a trolley wire for each hook end and having pivots extending from the sides thereof engaging the curved bearing surfaces of the hook ends and having stops extending from its sides that coact with the said outer curved surfaces of the hook ends.

Signed at Newark, in the county of Essex and State of New Jersey, this 4th day of December, A. D. 1914.

EMIL W. NITZSCHE.

Witnesses:
A. A. DE BONNEVILLE.
JOHN JESSICH.

Copies of this patent may be obtained for five cents each, by addressing the "Commissioner of Patents, Washington, D. C."